(No Model.) 10 Sheets—Sheet 1.

G. E. HUNTER.
METHOD OF TESTING WATCH BALANCES AND HAIR SPRINGS.

No. 490,203. Patented Jan. 17, 1893.

(No Model.) 10 Sheets—Sheet 2.
G. E. HUNTER.
METHOD OF TESTING WATCH BALANCES AND HAIR SPRINGS.
No. 490,203. Patented Jan. 17, 1893.

(No Model.)  10 Sheets—Sheet 3.
G. E. HUNTER.
METHOD OF TESTING WATCH BALANCES AND HAIR SPRINGS.
No. 490,203. Patented Jan. 17, 1893.

Witnesses:
Jas. E. Hutchinson.
Henry C. Hazard.

Inventor:
George E. Hunter, by
Prindle and Russell, his attorneys (No Model.) 10 Sheets—Sheet 4.

G. E. HUNTER.
METHOD OF TESTING WATCH BALANCES AND HAIR SPRINGS.

No. 490,203. Patented Jan. 17, 1893.

Witnesses:
Jas. E. Hutchinson
Henry C. Hazard

Inventor.
George E. Hunter, by
Arundel and Russell, his Attorneys

(No Model.)  10 Sheets—Sheet 5.

G. E. HUNTER.
METHOD OF TESTING WATCH BALANCES AND HAIR SPRINGS.

No. 490,203.  Patented Jan. 17, 1893.

(No Model.) 10 Sheets—Sheet 8.
G. E. HUNTER.
METHOD OF TESTING WATCH BALANCES AND HAIR SPRINGS.

No. 490,203. Patented Jan. 17, 1893.

(No Model.) 10 Sheets—Sheet 9.

G. E. HUNTER.
METHOD OF TESTING WATCH BALANCES AND HAIR SPRINGS.

No. 490,203. Patented Jan. 17, 1893.

Witnesses:
Jas. E. Hutchinson.
Henry C. Hazard.

Inventor.
George E. Hunter, by
Crindle and Russell, his Attorneys (No Model.) 10 Sheets—Sheet 10.
G. E. HUNTER.
METHOD OF TESTING WATCH BALANCES AND HAIR SPRINGS.
No. 490,203. Patented Jan. 17, 1893.

Witnesses:
Jas. E. Hutchinson.
Henry C. Hazard.

Inventor:
George E. Hunter, by
Kindle & Russell, his Attorneys

UNITED STATES PATENT OFFICE.

GEORGE E. HUNTER, OF ELGIN, ASSIGNOR TO THE ELGIN NATIONAL WATCH COMPANY, OF CHICAGO, ILLINOIS.

METHOD OF TESTING WATCH-BALANCES AND HAIR-SPRINGS.

SPECIFICATION forming part of Letters Patent No. 490,203, dated January 17, 1893.

Application filed July 2, 1892. Serial No. 438,779. (No model.)

*To all whom it may concern:*

Be it known that I, GEORGE E. HUNTER, of Elgin, in the county of Kane, and in the State of Illinois, have invented certain new and useul Improvements in Methods of Testing Watch-Balances and Hair-Springs; and I do hereby declare that the following is a full, clear, and exact description thereof, reference being had to the accompanying drawings, in which—

Letters of like name and kind refer to like parts throughout the several figures.

My invention relates to the timing and adjusting of watch balances and hair springs before the same are placed in watch movements, and such invention consists in the process employed, substantially as and for the purpose hereinafter specified.

In the carrying of my invention into practice there is necessary a mechanism for vibrating a balance, or hair spring, an indicating or registering mechanism, a time mechanism and certain electrical appliances whereby the said mechanisms may be placed in operation and caused to co-operate so as to furnish accurate data as to the action of the parts being tested. Various forms and construction of mechanical appliances may be employed, but it will sufficiently illustrate my invention to show the operation of the mechanism preferably used, commencing with the vibrator, which is contained within a casing that is composed of a base section A and a top section A' that fits upon and is secured to the same, such casing having top, bottom and sides, and rounded ends.

Midway between the base and top sections, A and A', respectively, is a plate B which is arranged parallel with said parts, and between the same and said base are journaled the parts of an ordinary time train that consists of a main arbor C that has a toothed wheel $c$ and is caused to rotate by means of a weight-actuated drum, a second arbor D having a pinion $d$ and a toothed wheel $d'$, a third arbor E provided with a pinion $e$ and toothed wheel $e'$, a fourth arbor F having a pinion $f$ and toothed wheel $f'$, a fifth arbor G provided with a pinion $g$ and escape wheel $g'$ a sixth arbor H carrying a pallet lever $h$ and a balance arbor or staff I which staff is journaled within said lower section, extends through said plate, and has its upper end journaled in a bridge K that is secured upon the latter.

Figure 5:
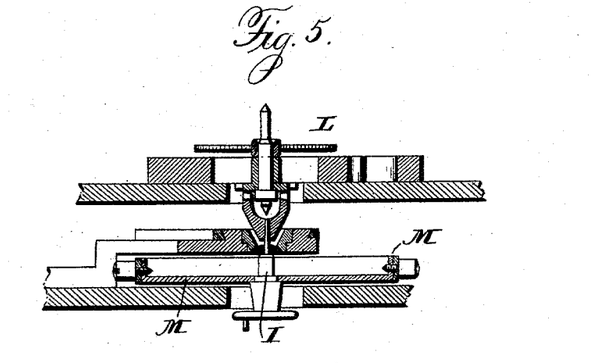
Fig. 5 is a longitudinal section of the balance arbor and shows the arrangement of parts when hair springs are to be tested.
Figure 6:
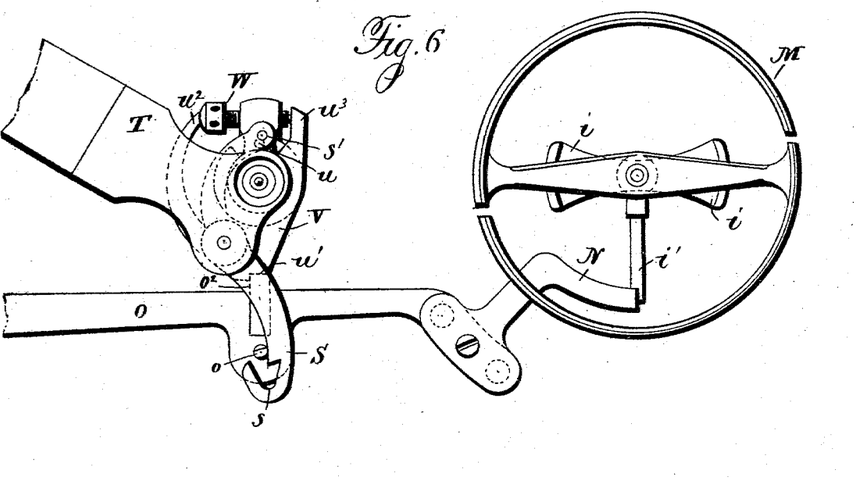
Fig. 6 is a plan view in outline of the locking and releasing mechanisms when the vibrating mechanism is locked from motion.
Figures 7, 8, 9, 10:
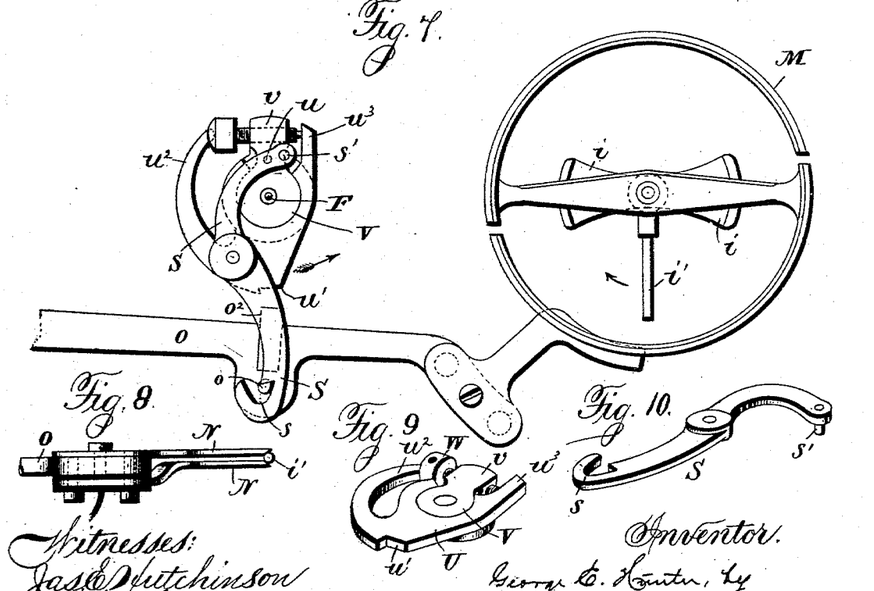
Fig. 7 is a like view of the same after the balance staff has been released.
Fig. 8 is an enlarged side elevation of the contact springs which are engaged by the contact pin of the balance staff.
Figs. 9 and 10 are, respectively, views of the locking plate of the fourth arbor and of the detent actuated thereby, separated from each other.
Figure 11:
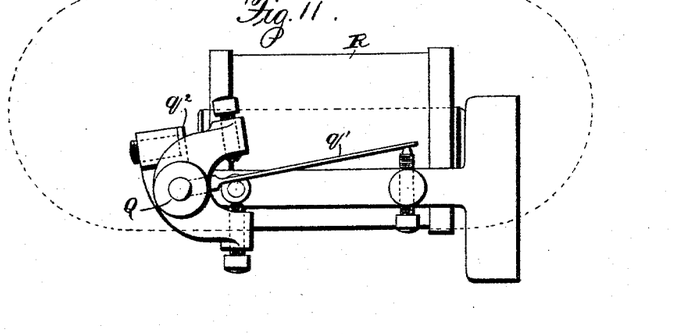
Fig. 11 is a plan view of the mechanism used for actuating the pawl shaft.
Figure 12:
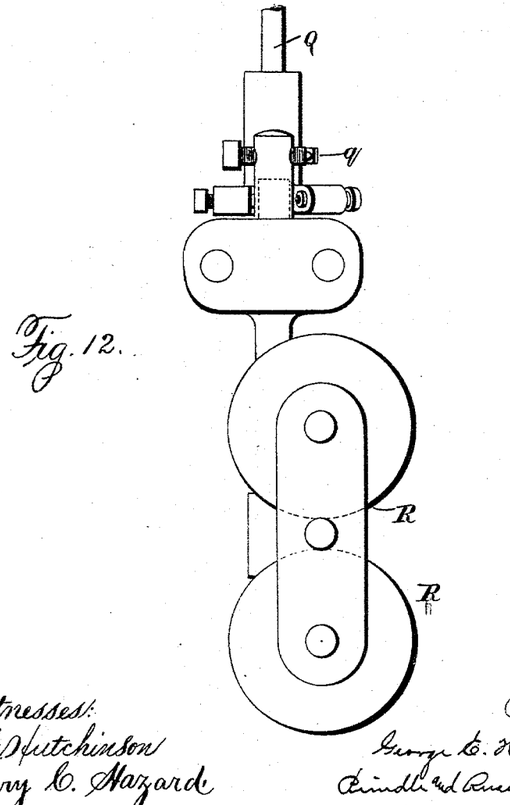
Figs. 12 and 13 are respectively front and side elevations of the same.
Figure 13:
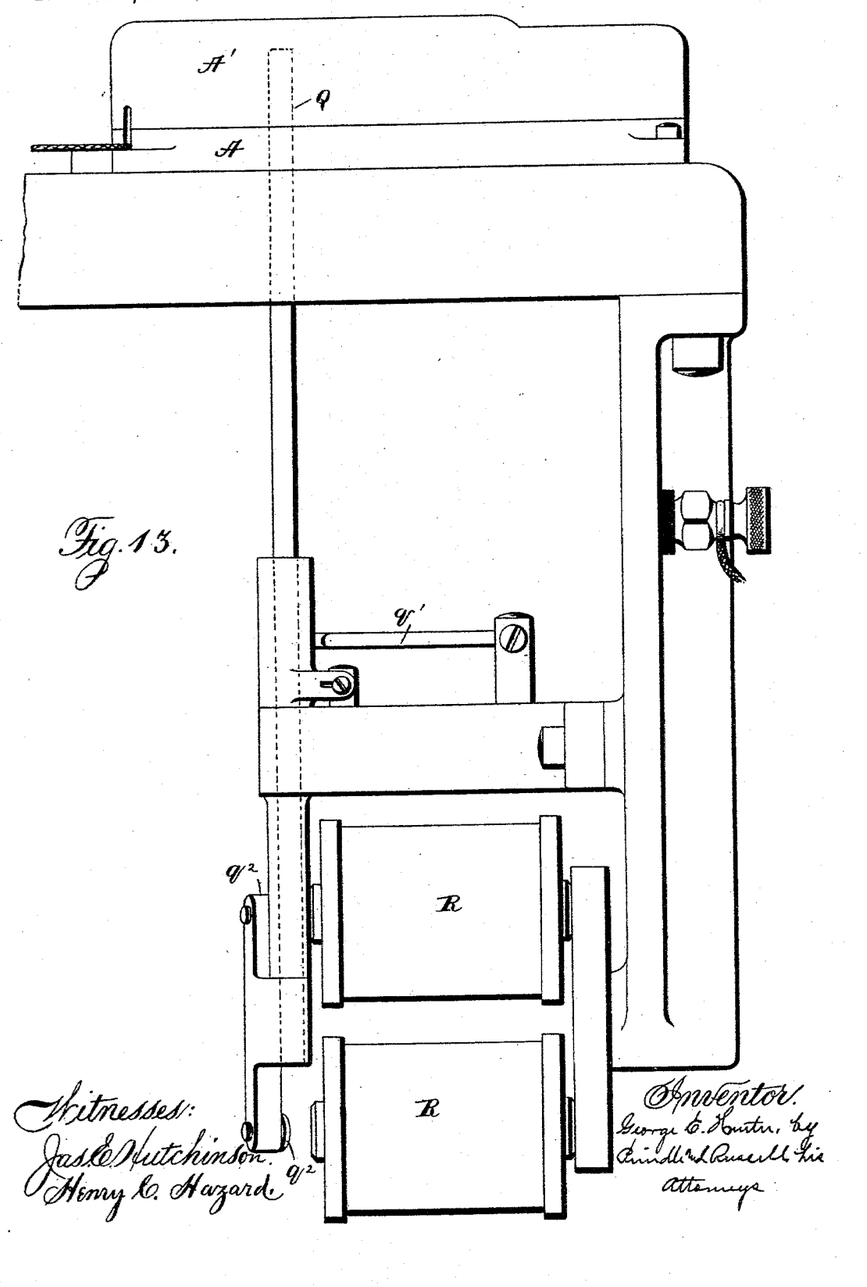

When used for testing balances, the staff I is provided with a standard hair spring L that is located below the bridge K, and upon its upper pivot carries a crotch $i$ that is adapted to receive a balance M, and support the same in proper position, when it becomes a part of and completes the time train. When the vibrator is employed for testing hair springs a standard balance is secured upon said staff below said bridge, and the upper end of the latter adapted to receive a hair spring L.

When a spring or balance has been placed in position it is desired that the balance staff should be capable of instant vibration, and that when it has vibrated a predetermined number of times, it shall complete an electric circuit at the point from which it started. To effect this there is secured to said staff, above the plate B, a radial pin $i'$, and within the plane of vibration of such pin are two flat springs N and N that are secured upon one end of a lever O which is pivoted near its opposite end and is adapted to be moved upon its pivot so as to cause said springs to be placed within the track of said pin, or to remove them from such track. Said springs are the terminals of an electric circuit and are arranged with their outer ends nearly parallel and separated by a distance less than the diameter of said pin so that when they are moved inward, the latter will pass between and engage with said springs, closing the circuit and arresting the motion of the balance staff.

The lever O is held normally in position to arrest motion of the balance staff I by means of a spring P that is arranged to engage with and press outward upon its rear end but is moved to the opposite limit of its motion by means of a shaft Q which is journaled vertically within the base section A and plate B and at its upper end is provided with a pawl $q$ that when such shaft is rotated in one direction is adapted to engage with the rear end of said lever and move the same inward, while when said shaft is rotated in an opposite direction said pawl will trip over said lever end. Said shaft is held at the rearward limit of its rotary motion by means of a radially arranged spring $q'$, and is moved in an opposite direction by an armature $q^2$ which is secured radially upon the shaft and is acted upon by two electro-magnets R and R that are suitably arranged with reference thereto. When the lever O has been moved to position to release the balance staff, it is locked in such position by means of a detent S that is pivoted upon a bridge T near the center or fourth arbor F and at one end is provided with a notch $s$ which is adapted to engage with a pin $o$ that projects upward from said lever. The shape of the notch is such as to cause the pin to automatically move said detent into position for engagement as said lever is turned to release the balance staff. At the completion of the predetermined number of vibrations of the balance staff the detent S is released from engagement with the pin $o$ and the lever O automatically returns to its normal position and thus causes the springs N and N to engage with the pin $i$ and arrest the motion of said staff. Such release is effected by means of a plate U which is secured upon and rotates with the fourth arbor F and is provided with a pin $u$, that, at the desired instant, engages with a similar pin $s'$ upon said detent and moves the latter in the direction necessary for disengagement from said pin $o$. At the instant when the lever O returns to its normal position a shoulder $u'$ upon the plate U engages with a lug $o^2$ upon said lever and operates to arrest the motion of the time train and to thus relieve the balance staff from all injurious shock or strain. In order that the engagement between said plate and lever may be effected at the precise instant desired, a cylindrical plate V is fastened upon the arbor F upon which said plate U is fitted so as to embrace about three fourths of its periphery, and be held thereon by friction. One side of the plate U is made open as shown, and is provided with two arms $u^2$ and $u^3$ between which is placed a screw W that has its ends in engagement with the contiguous faces of said ends and its threaded body contained within a threaded lug $v$ which is formed upon and extends radially from said plate V. As thus arranged, by turning said screw it will be moved lengthwise through said boss and cause said plate U to be turned upon said plate V so as to change the position of the shoulder $u'$ with relation to the arbor F.

The springs N and N, not only act as stops to arrest the motion of the balance arbor, but also as circuit closers, for which purpose the lower spring is insulated from the other and connected electrically with an insulated binding post X by a wire $x$, while the upper spring is secured directly upon the lever O and through the same and the casing, or by any usual means, is in connection with a second binding post X'. As thus arranged it will be seen that when the pin $i$ passes between the ends of said springs an electric connection is instantly produced.

Figure 14:
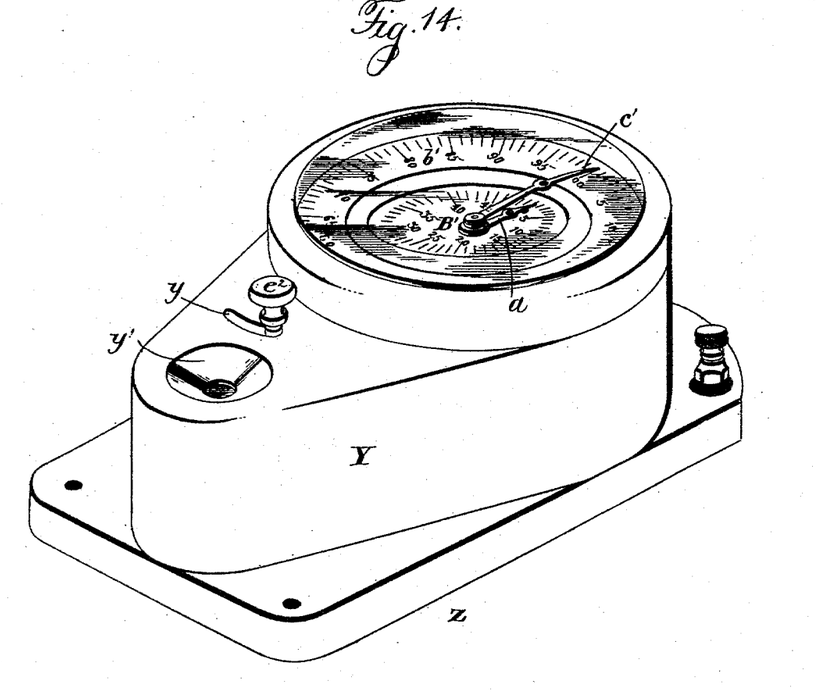
Fig. 14 is a perspective view of the registering mechanism preferably used.
Figure 15:
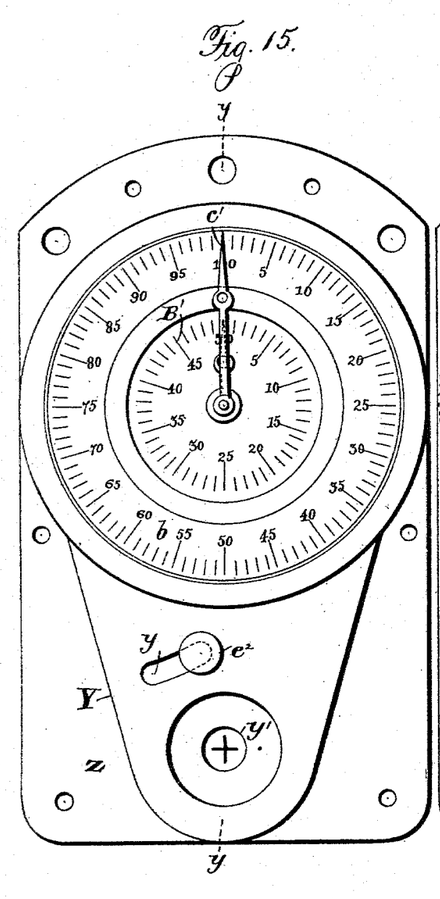
Fig. 15 is a plan view of the same.
Figure 16:
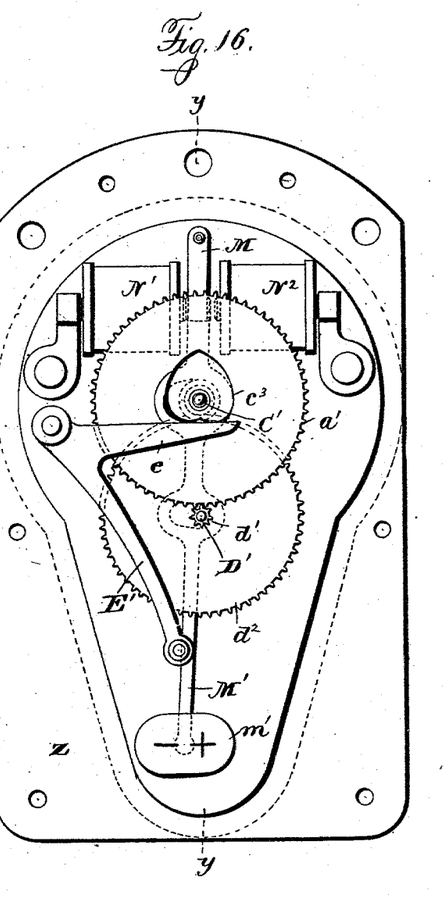
Fig. 16 is a like view of said mechanism from the upper side with the top of the casing removed.
Figure 17:
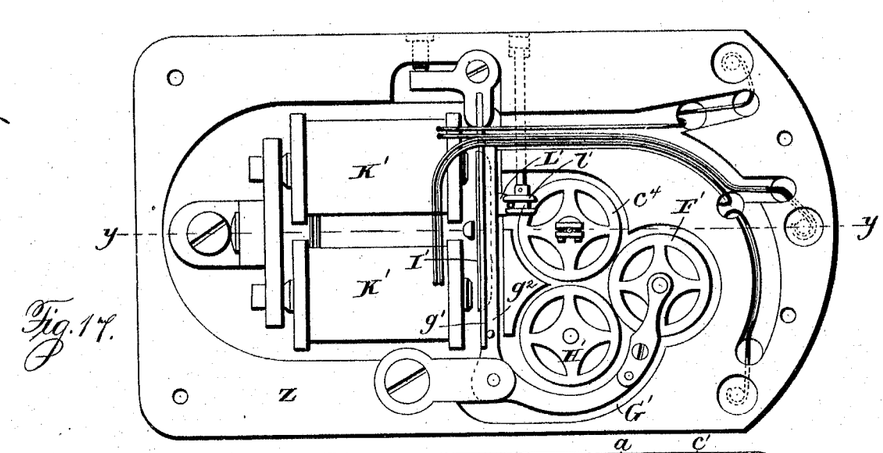
Fig. 17 is a plan view of the lower side of the same.
Figure 18:
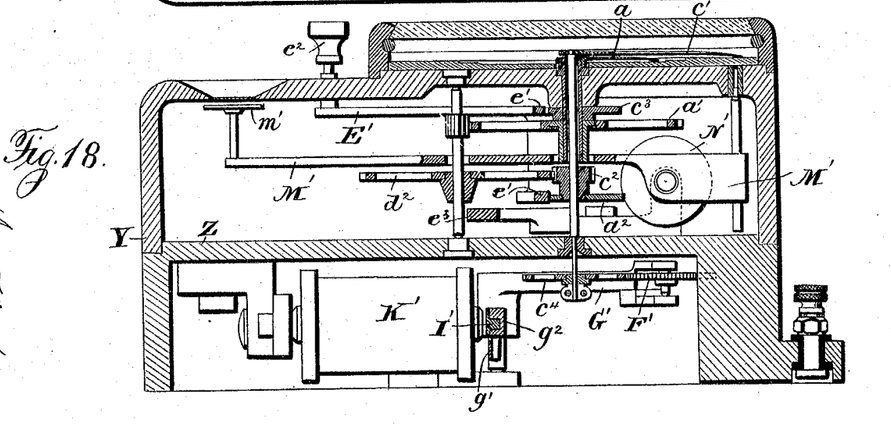
Fig. 18 is a longitudinal section upon line $y$—$y$ of Figs. 15, 16, and 17.
Figure 19:
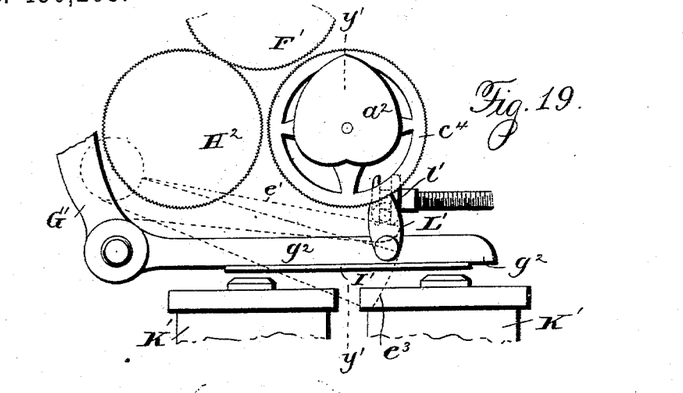
Fig. 19 is a plan view in outline of the arresting and releasing mechanism when occupying its normal or locked position.
Figure 20:
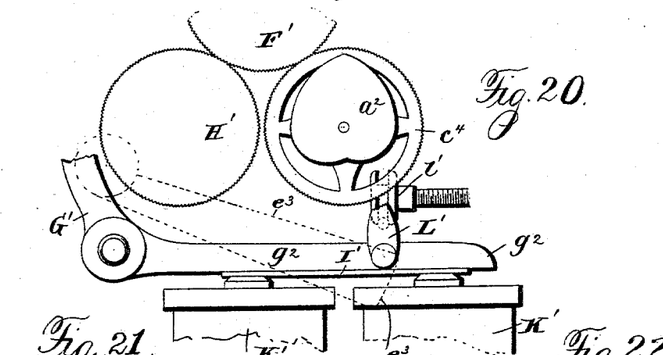
Fig. 20 is a like view of the same when the registering train is free to move.
Figure 21:
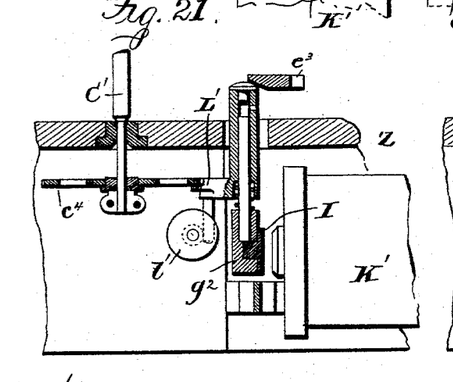
Fig. 21 is a section upon line $y'$—$y'$ of Fig. 20 and shows the locking device in engagement with the main wheel of the register train.
Figure 22:
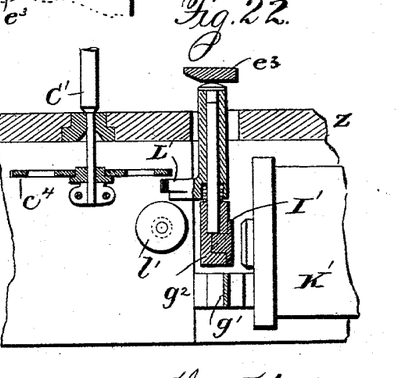
Fig. 22 is a like view of the same showing said device when released by the hands-setting lever before setting the hands to zero.

The registering mechanism is inclosed within a casing Y which has the form shown in Figs. 14, 15 and 16 and is supported and secured upon a hollow base Z that in turn rests upon and is attached to a bench or other suitable support. Within said casing is journaled a vertical, hollow arbor $A^2$, which upon its upper end carries a hand $a$ that by the rotation of said arbor will be caused to move over a circular dial B' which is secured upon the upper side of the casing and is provided with fifty equal divisions $b$, $b$, &c. Within said hollow arbor is journaled an arbor C' which extends downward into the hollow base Z and upon its upper end has secured a hand $c'$ that is longer than said hand $a$ and when said arbor is rotated travels over a second series of divisions $b'$, $b'$, &c., numbered from 1 to 100 which are provided upon said dial.

Journaled at one side of and parallel with the arbors A² and C' is an arbor D' that carries a toothed wheel $d$ and a pinion $d'$, the first of which parts meshes with and receives motion from a pinion $c^2$ that is secured upon said arbor C' while said pinion $d'$ meshes with and imparts motion to a toothed wheel $a'$ which is carried by said arbor A², the relative dimensions of said pinions and wheels being such as to cause the shorter hand $a$ to move forward one degree for each complete rotation of the longer hand $c'$. The engagement between the pinion $c^2$ and the arbor C' and the wheel $a'$ and the arbor A² is produced by friction so that each arbor is capable of being independently turned in order to set the hands at zero. This is effected by means of two heart-shaped cams $a^2$ and $c^3$ which are secured, respectively, upon said arbors A² and C' and are simultaneously acted upon by the arms $e'$ and $e'$ of a lever E' that is journaled within the casing and operated by means of a knob $e^2$ that projects through a slot $y$ in the upper side of the casing Y.

The register mechanism is driven by any suitable motor through the arbor C' for which purpose there is secured to the lower projecting end of the latter a toothed wheel $c^4$ that is adapted to be engaged by an intermediate toothed wheel F' which is pivoted upon one end of a pivoted bar G' and is in constant engagement with a motor driven wheel H' the arrangement being such as to enable said wheels $c^4$ and F' to be engaged or disengaged by the movement of said bar upon its pivotal bearing. The bar G', is by means of a spring $g'$ held normally in such position as to cause the wheels $c^4$ and F' to be disengaged and is moved in an opposite direction by means of an armature I' which is secured to an arm $g^2$ that extends laterally from said bar. Said armature is moved by means of an electro-magnet K' in the usual way, but for purposes hereinafter stated, each coil of such magnet is made double, so that when currents of electricity having equal strength are passing at the same time and in opposite directions through the wires they will neutralize each other and produce no magnetism, but if one current is interrupted, then the other current will act with full effect and the armature will be attracted.

It is necessary that the registering mechanism shall be locked from movement when not intentionally caused to operate, for which purpose there is employed a detent L' that is arranged to be moved vertically into and out of engagement with the teeth of the wheel $c^3$ of the arbor C' and by spring pressure, is held normally at the upper limit of its motion in engagement with said wheel. When the hands are being set at zero, said detent is moved out of engagement by means of an inclined portion of the arm $e^2$ of the cam lever E' which arm passes over the end of said detent and moves the same downward just before the impinging of the arm $e'$ upon the cam $c^3$. As soon as said cam lever is released and returns to its normal position, said detent automatically engages with said wheel $c^4$. A laterally adjustable clamp $l'$ engages with said detent and enables it to be moved so as to cause it to exactly coincide with the teeth of said wheel. To permit of the disengagement of said detent at the instant a connection is made between the motor and registering mechanism, it is secured upon and supported by the arm $g^2$ of the bar G' and with such arm is moved horizontally away from the wheel $c^4$ by the action of the electro-magnet upon the armature I'.

In order that it may be indicated which of the two currents sets the registering mechanism into operation,—there is pivoted at one end within one end of the casing Y, a bar M' which upon its opposite, free end carries a plate or dial $m'$ that by movement of said lever upon its pivotal bearing may be caused to move horizontally to a limited distance beneath a glazed opening $y'$ in the top of said casing. Upon such dial are the conventional signs for the terms plus and minus (+ and −) and by the movement of said bar to the limit of its motion in either direction, one or the other of said signs will be brought into sight.

Two electro-magnets N' and N² are provided to act upon the bar M', one of which magnets is placed upon each side thereof, near its pivoted end and opposite to an armature carried by it. Each of these coils forms part of one of the electric circuits of the magnet K' and it will be obvious that, whichever coil, (N' or N²) receives the current first, it will be able to hold the bar M' in opposition to the magnetism induced by a current of the same strength in the other coil. The sign exposed on the plate $m'$ will indicate, then, the circuit first closed. Another portion of the system is a polarized relay O' which has the usual construction and is connected electrically—through a standard clock P'—with a battery Q' so as to enable such clock to control and cause its armature $o^3$ to close or open either of two circuits and thus connect either of two sets of registers with another battery R'.

Figure 1:
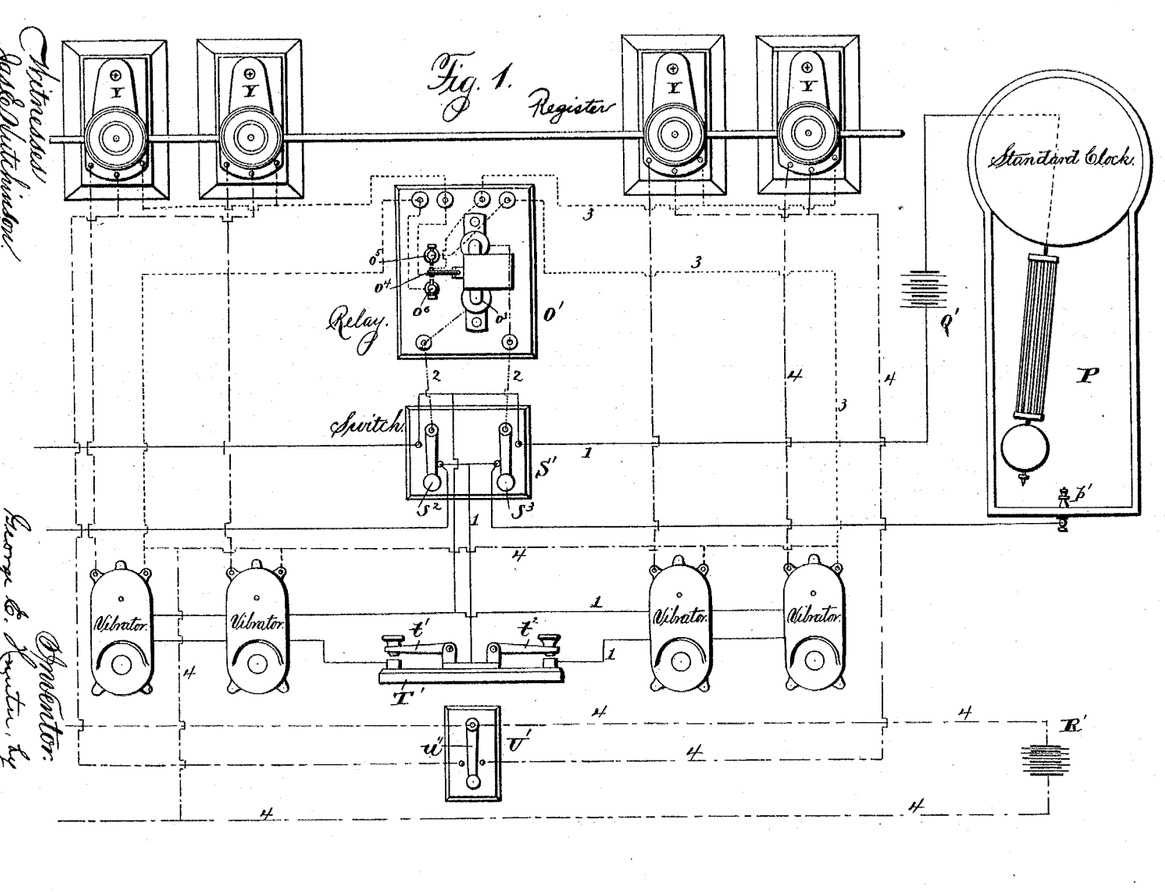
Figure 1 is a plan view of my apparatus in which is shown the relative arrangement of parts and the electric circuits connecting the same.
Figure 2:
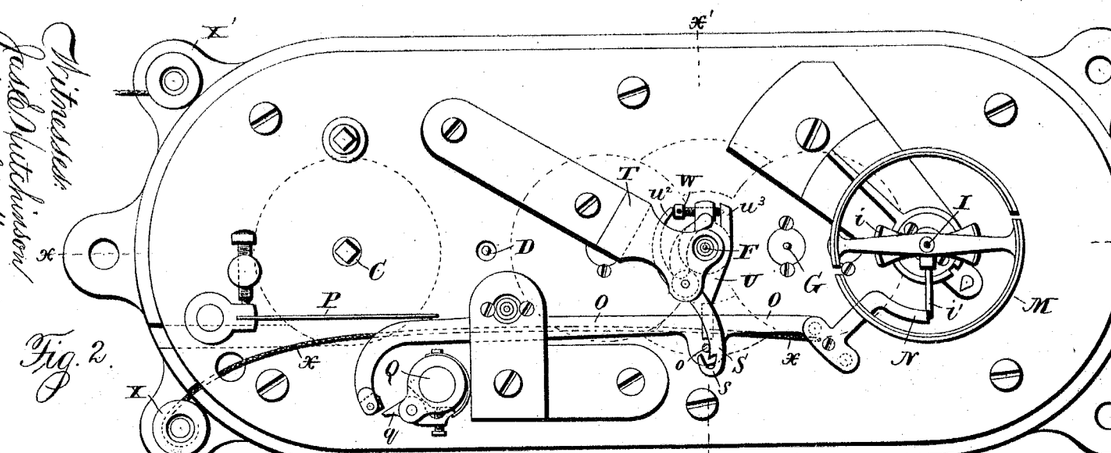
Fig. 2 is a plan view of the operating mechanism of the vibrator employed the top of the casing being removed.
Figure 3:
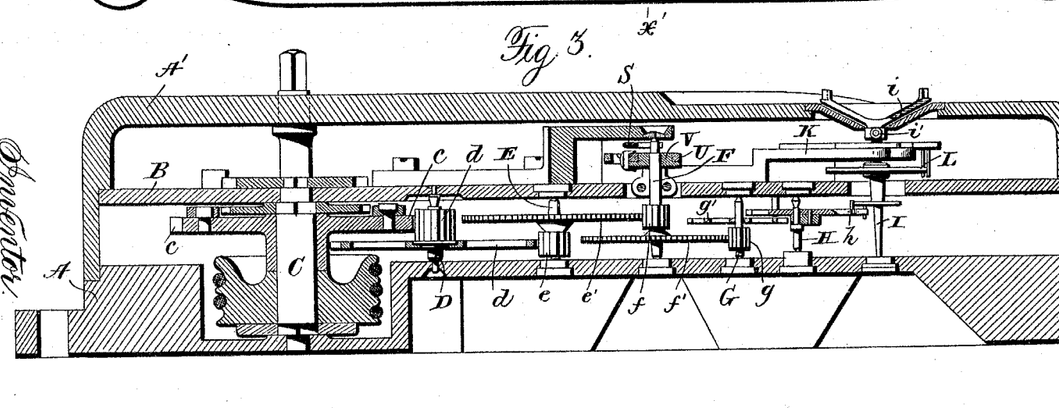
Fig. 3 is a central longitudinal section of said vibrator upon line $x$—$x$ of Fig. 2.
Figure 4:
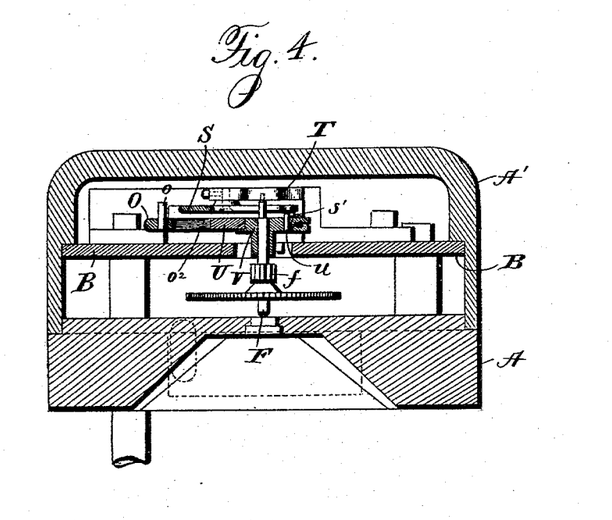
Fig. 4 is a cross section of the same upon line $x'$—$x'$ of Figs. 2 and 3.

The mechanisms described may occupy any desired relative positions, but as shown in Fig. 1, the arrangement is preferably as follows, viz: Two or more vibrators for each set are arranged side by side upon a suitable support, and a like number of registers is located conveniently near, preferably upon the opposite side of a bench or table. Midway between said vibrators and registers is placed the polarized relay, a double switch S' having two levers $s^2$ and $s^3$ is placed in front of said relay, a circuit closer T' having two keys $t'$ and $t^2$, is next in order and a switch U' having a single lever $u'$ is placed in front of said circuit closer. The standard clock P' has a mercurial contact mechanism $p'$ at the lower end of its pendulum which operates to connect electrically with a battery Q', the magnets R and R that actuate the pawl shafts Q and Q of one set of vibrators, such connection being made through the switch S' and circuit closer T' as shown in Fig. 1, and for convenience being designated No. 1. From the switch a second circuit, No. 2, branches off from No. 1 and extends to each of the magnet coils of the relay O', by which means a current from the battery Q' may be caused to pass through either of said coils and thus move the armature to cause its contact piece $o^4$ to close a third circuit No. 3, which circuit No. 3, is formed by a wire that extends from the battery R', to the relay O' where it is connected with one of the fixed contacts $o^5$ and $o^6$ of said relay and with the contact $o^4$ of its armature, and from thence passes to and includes the magnet K' of each register of the set and from thence through the switch U' back again to said battery, while a fourth circuit No. 4 extends from the battery R' through the switch U' to the registers, then around the coils of each magnet, thence to each vibrator, and from thence back to said battery, the arrangement being such that each register is connected electrically with one vibrator of the set so that while the same circuit is employed for all of each set, the action of each is independent of the others. The operator now places balances or hair springs in position in one set of vibrators, and then manipulates the key $t'$ of the circuit closer T' which causes the next beat of the clock to send a current through the clock circuit No. 1 so as to release the time train of each vibrator and permit the same to instantly commence movement, after which, by means of the switch U', the battery R' is thrown into circuit upon the same side of the apparatus in readiness for use when needed. Just before the expiration of one minute the operator moves the lever $s^3$ of the switch S' so as to connect the clock with the relay—by circuit No. 2—when the last beat of the minute from said clock sends a current from the battery Q' through the magnet coils of said relay and closes the circuit No. 3 between the battery R' and the registers upon that side through the contact $o^5$ of said relay.

If either of the balances, or hair springs being tested, is slow, the hands of the connected register will instantly commence to turn and will continue in motion until the balance has completed three hundred vibrations, when the contact springs N and N will be moved into engagement with the pin of the balance staff and closing circuit No. 4 between the vibrator and register will neutralize the current of circuit No. 3 upon the magnets of said register and operate to instantly arrest the motion of its hands. The position of said hands will indicate the number of seconds of variation of the balance, or spring in twenty four hours and the appearance of the —, or minus sign will show that said balance or spring is slow.

Should a balance or spring be fast the vibrator controlled circuit No. 4 will be closed at the expiration of the time required for the balance to make three hundred vibrations, and the hands of the register will be instantly started and continue to run until their motion is arrested by the clock circuit No. 3 at the expiration of one minute, when the +, or plus sign will be shown, and the position of said register hands will indicate the number of seconds which the balance or spring is fast in twenty four hours. If the balance or spring be perfect, then it will complete its three hundred vibrations exactly in a minute and accordingly the vibrator controlled circuit will be closed simultaneously with the clock-controlled circuit, and since the two currents flowing through the coils of the magnets K' and K' will neutralize each other, the register will not be set in motion.

The apparatus shown and described is not claimed herein, but is made the subject matter of a separate application filed by me of even date herewith and having Serial No. 438,778.

Having thus described my invention what I claim is:—

1. The method of testing balances and hair springs which consists in vibrating the same the number of times that a standard balance or spring would vibrate in a definite interval of time, in unison with a standard time piece and employing in connection therewith an indicating mechanism that is actuated only when the balance or spring varies from the standard, substantially as and for the purpose specified.

2. The method of testing balances and hair springs which consists in vibrating the same the number of times that a standard balance or spring would vibrate in a definite interval of time, in unison with a standard time piece and employing in connection therewith an indicating mechanism that is put in operation when the balance or spring is fast upon the completion of the number of vibrations, and is stopped at the expiration of the interval of time, substantially as and for the purpose set forth.

3. The method of testing balances and hair springs which consists in vibrating the same the number of times that a standard balance or spring would vibrate in a definite interval of time, in unison with a standard time piece, and employing in connection therewith an indicating mechanism that is put in operation when the balance or spring is slow upon the completion of the interval of time, and stopped when the number of vibrations has been made, substantially as and for the purpose shown.

4. The method of testing balances and hair springs which consists in vibrating the same the number of times that a standard balance or spring would vibrate in a definite interval of time, in unison with a standard time piece, and employing in connection therewith an indicating mechanism which is actuated only when the balance is fast or slow, and whose action is commenced in the former instance upon the completion of the number of vibrations and stopped at the expiration of the interval of time, and in the latter instance, is commenced at the conclusion of the interval of time and stopped when the number of vibrations has been made, substantially as and for the purpose shown and described.

In testimony that I claim the foregoing I have hereunto set my hand this 23d day of May, 1892.

GEORGE E. HUNTER.

Witnesses:
GEO. S. PRINDLE,
W. H. CLOUDMAN.